(12) United States Patent
Han et al.

(10) Patent No.: US 8,749,299 B2
(45) Date of Patent: Jun. 10, 2014

(54) SEMICONDUCTOR DEVICE GENERATING VARIED INTERNAL VOLTAGES

(75) Inventors: Dong Hoon Han, Daejeon Metropolitan (KR); Woo Young Lee, Gyeonggi-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 1061 days.

(21) Appl. No.: 12/205,975

(22) Filed: Sep. 8, 2008

(65) Prior Publication Data
US 2009/0206914 A1    Aug. 20, 2009

(30) Foreign Application Priority Data

Feb. 14, 2008  (KR) .................. 10-2008-0013684

(51) Int. Cl.
*G05F 1/10*  (2006.01)
*H02M 3/07*  (2006.01)
(52) U.S. Cl.
CPC ............................ *H02M 3/073* (2013.01)
USPC ....................................... 327/536
(58) Field of Classification Search
USPC ........... 327/530, 534–538, 540, 541, 544, 72, 327/73, 108
See application file for complete search history.

(56) References Cited

U.S. PATENT DOCUMENTS

| | | | | |
|---|---|---|---|---|
| 6,411,157 B1 * | 6/2002 | Hsu et al. | ....... | 327/536 |
| 6,753,720 B2 * | 6/2004 | Kono et al. | ....... | 327/538 |
| 7,348,828 B2 * | 3/2008 | Lee et al. | ....... | 327/536 |
| 7,362,164 B2 * | 4/2008 | Kang | ....... | 327/536 |
| 7,443,230 B2 * | 10/2008 | Chen et al. | ....... | 327/535 |
| 7,456,676 B2 * | 11/2008 | Sohn | ....... | 327/333 |
| 7,583,134 B2 * | 9/2009 | Kang | ....... | 327/536 |
| 2008/0111904 A1 * | 5/2008 | Lee | ....... | 348/308 |
| 2009/0168583 A1 * | 7/2009 | Kwon et al. | ....... | 365/226 |

FOREIGN PATENT DOCUMENTS

| KR | 1020030087813 A | 11/2003 |
|---|---|---|
| KR | 1020060135367 A | 12/2006 |
| KR | 1020070001729 A | 1/2007 |
| KR | 1020070033641 A | 3/2007 |

* cited by examiner

*Primary Examiner* — Sibin Chen
(74) *Attorney, Agent, or Firm* — Ladas & Parry LLP (57) ABSTRACT

The present invention describes a semiconductor device that generates internal voltages having different levels using an external voltage. The semiconductor device includes a plurality of asynchronous internal voltage generating circuits that share an external voltage source and generate internal voltages having different levels from one another. The plurality of asynchronous internal voltage generating circuits maintain the levels of the internal voltages at target levels by using the external voltage at different time points, respectively. The semiconductor device minimizes noise in the external voltage according to the use of the internal voltages.

29 Claims, 7 Drawing Sheets

SEMICONDUCTOR DEVICE GENERATING VARIED INTERNAL VOLTAGES

CROSS-REFERENCE TO RELATED APPLICATIONS

The present application claims priority to Korean patent application number 10-2008-0013684 filed on Feb. 14, 2008, which is incorporated herein by reference in its entirety.

BACKGROUND OF THE INVENTION

The present invention relates generally to a semiconductor device, and more particularly to a semiconductor device which generates internal voltages having different levels using an external voltage.

Generally, a semiconductor device such as DRAM generates and uses various internal power sources using an external power as a source. For example, in order to transfer data stored in a memory cell to a bit line without a voltage drop due to a threshold voltage, a DRAM generates a pumping voltage having a higher voltage level than that of the an external voltage by pumping the supplied external voltage. The DRAM then provides the generated pumping voltage to a word line.

Figure 1:
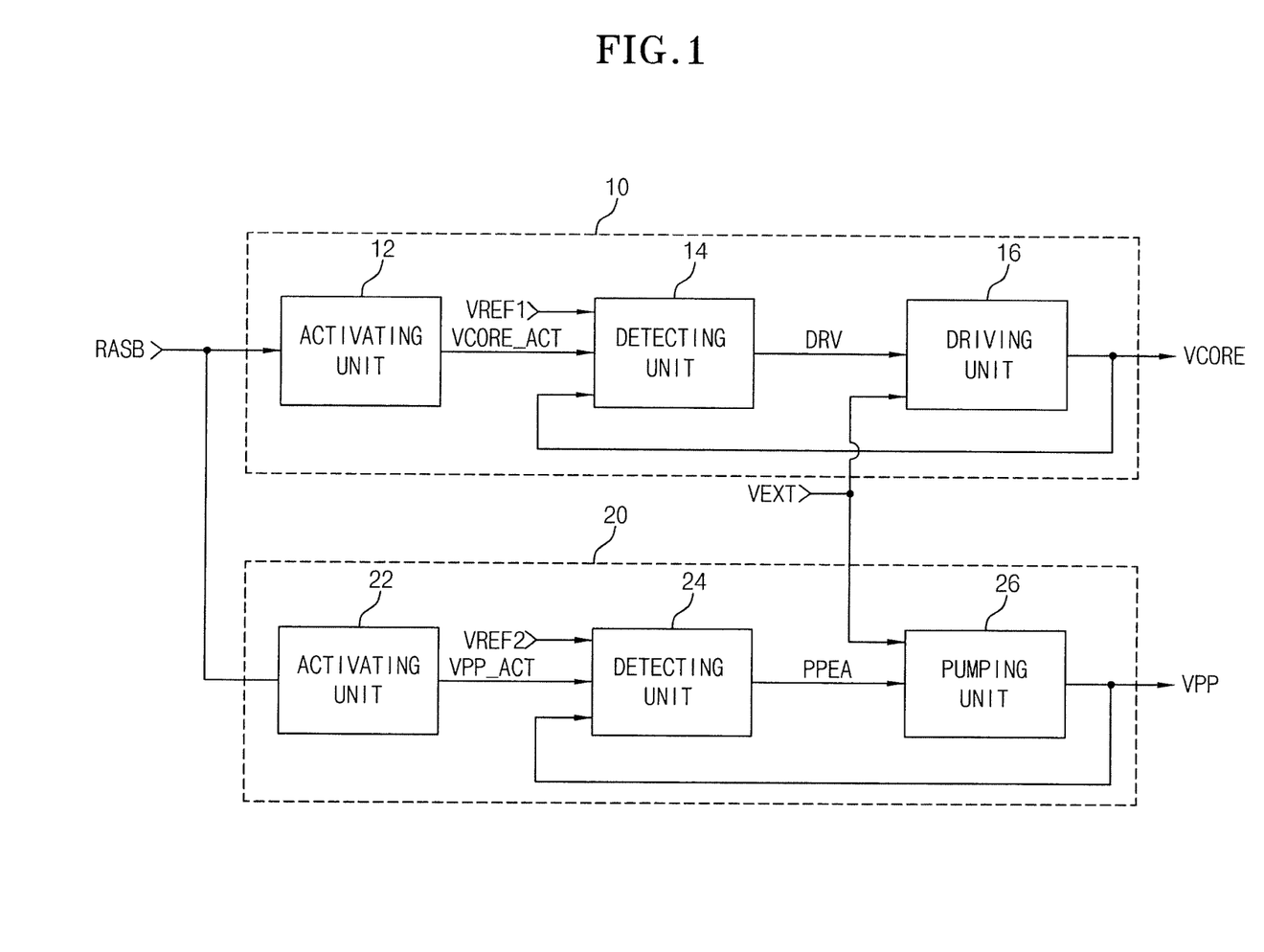
FIG. 1 is a block diagram showing internal voltage generating circuits of a conventional semiconductor device.

A conventional circuit which generates such an internal voltage may be provided, as shown in FIG. 1, with a core voltage generating circuit 10 which generates a core voltage VCORE and a pumping voltage generating circuit 20 which generates a pumping voltage VPP.

The core voltage generating circuit 10 includes an activating unit 12 which outputs an activation signal VCORE_ACT in response to an external command signal, i.e. a RAS command signal RASB. The core voltage generating circuit 10 also includes a detecting unit 14 which compares and detects a potential difference between the core voltage VCORE fed back to the detecting unit 14 and a reference voltage VREF1 in response to the activation signal VCORE_ACT and outputs the detection result as a drive signal DRV. The core voltage generating circuit 10 includes a driving unit 16 which generates the core voltage VCORE by driving an external voltage VEXT in response to the drive signal DRV.

The pumping voltage generating circuit 20 includes an activating unit 22 which outputs an activation signal VPP_ACT in response to the RAS command signal RASB. The pumping voltage generating circuit 20 also includes a detecting unit 24 which compares and detects a potential difference between the pumping voltage VPP fed back to the detecting unit 24 and a reference voltage VREF2 in response to the activation signal VPP_ACT and outputs the detection result as a drive signal PPEA. The pumping voltage generating circuit 20 includes a pumping unit 26 which generates the pumping voltage VPP by pumping the external voltage VEXT in response to the drive signal PPEA.

Figure 2A:
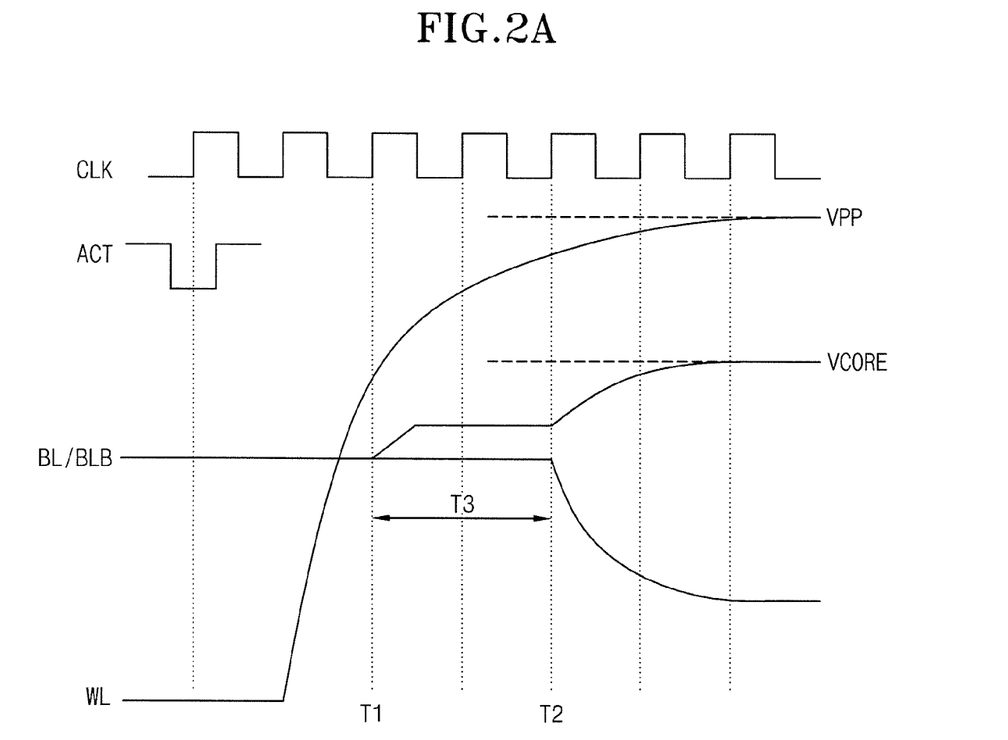
FIGS. 2A and 2B are waveform diagrams for explaining the operating points of the internal voltage generating circuits 10 and 20 in FIG. 1.

The conventional semiconductor device including the internal voltage generating circuits 10 and 20 as described above activates a word line WL by supplying the pumping voltage VPP when an active command ACT is inputted synchronously with a clock signal CLK, and develops a bit line pair BL and /BL by supplying the core voltage VCORE after a charge sharing as shown in FIG. 2A.

At this time, the pumping voltage VPP level may drop as the pumping voltage VPP is supplied to the word line WL. The level pumping of the pumping voltage VPP may be performed after a point 'T2' as the detecting unit 24 cannot detect this drop of the pumping voltage VPP level within the period 'T3'.

Figure 2B:
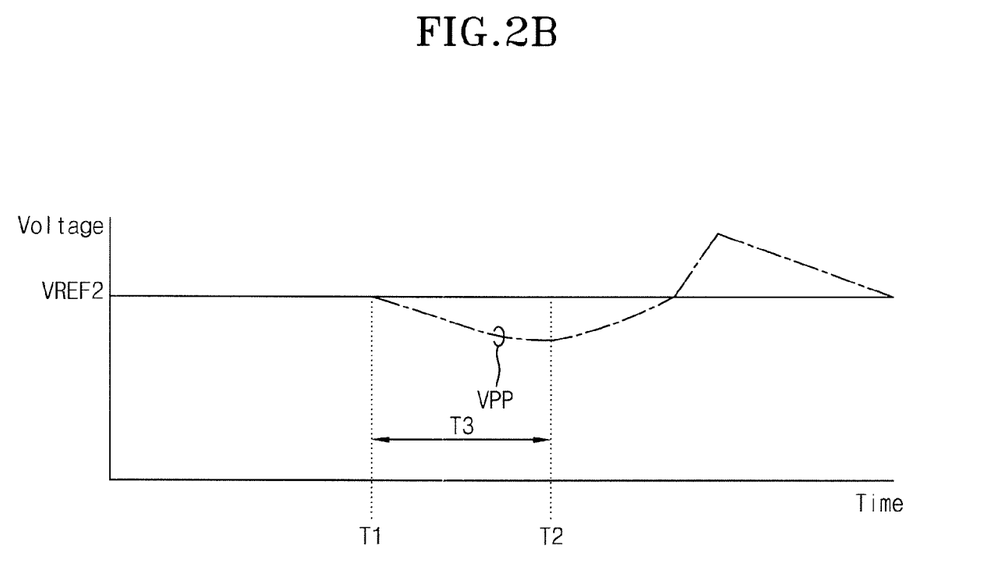

In other words, as shown in FIG. 2B, when the pumping voltage VPP level drops below the reference voltage VREF2 level at point 'T1', the pumping voltage VPP level is raised via the detecting unit 24 and the pumping unit 26. At this time, a series of operations occur including, detecting the level drop of the pumping voltage VPP at 'T1' through the detecting unit 24. The drive signal PPEA is then enabled and the pumping voltage VPP level is pumped through the pumping unit 26 which takes longer than a period 'T3'. Thus, the pumping of the pumping voltage VPP level is actually performed after 'T2'. The external voltage VEXT is consumed after 'T2' by the pumping of the pumping voltage VPP level.

Also, the driving unit 16 consumes the external voltage VEXT to maintain the core voltage VCORE level at the reference voltage VREF1 since the core voltage VCORE is supplied to the bit line BL or the bit bar line BLB from the point 'T2'. In other words, after the point 'T2', the external voltage VEXT level drops due to the use of the core voltage VCORE.

As such, in the conventional semiconductor device, the level drop of the external voltage VEXT due to the pumping of the pumping voltage VPP and the level drop of the external voltage VEXT due to the driving of the core voltage VCORE are generated almost simultaneously with respect to the point 'T2'.

However, when the external voltage VEXT is used in duplicate for the pumping of the pumping voltage VPP and the driving of the core voltage VCORE, a peak value of the external voltage VEXT level drop is instantly increased. This increase may generate a large amount of noise in the external voltage VEXT.

In this case, problems including the lowering of chip properties may occur eventually leading to a malfunction of the semiconductor chip.

SUMMARY OF THE INVENTION

There is provided a semiconductor device which can reduce a peak level drop of an external voltage due to generation of internal voltages.

Also, there is provided a semiconductor device which can prevent a malfunction due to generation of a noise in an external voltage.

According to a first embodiment of the present invention, there is provided a semiconductor device, which includes a plurality of asynchronous internal voltage generating circuits sharing an external voltage and generating internal voltages having different levels from one another, wherein at least one of the plurality of asynchronous internal voltage generating circuits generates the internal voltage having a predetermined target level at a point different from that of the rest asynchronous internal voltage generating circuits by using the external voltage.

Preferably, the plurality of the internal voltage generating circuits are supplied with the external voltage at different points from one another and compensate level drops according to the uses of the internal voltages, thereby maintaining the levels of the internal voltages to the target levels, respectively.

Preferably, the plurality of the asynchronous internal voltage generating circuits includes a first asynchronous internal voltage generating circuit generating a first internal voltage usable in a circuit using the external voltage and maintaining the first internal voltage to its target level by being supplying with the external voltage when the first internal voltage is used in the circuit; and a second asynchronous internal voltage generating circuit generating a second internal voltage usable in the circuit using the external voltage and maintaining the second internal voltage to its target level by being supplying with the external voltage before the first internal voltage is used in the circuit.

Preferably, the first asynchronous internal voltage generating circuit generates the first internal voltage and maintains the level of the generated first internal voltage by driving the external voltage, and the second asynchronous internal voltage generating circuit generates the second internal voltage and maintains the level of the generated second internal voltage by pumping the external voltage.

Preferably, the first and second asynchronous internal voltage generating circuits generate the first and second internal voltages and maintain the generated the first and second internal voltages by pumping the external voltage.

Preferably, the plurality of the asynchronous internal voltage generating circuits includes a first asynchronous internal voltage generating circuit generating a first internal voltage having a level substantially the same as its target level with the external voltage and maintaining the first internal voltage to the target level with the external voltage when the fed back first internal voltage is out of the target level; and a plurality of second asynchronous internal voltage generating circuits sequentially generating second internal voltages having levels higher than their target levels using the external voltage and maintaining the second internal voltages to the target levels with the external voltage when the fed back second internal voltages are lowered below the target levels, respectively.

Preferably, the respective second asynchronous internal voltage generating circuit includes an initial overdrive control unit generating an initial overdrive signal; and an internal voltage generating circuit generating the second internal voltage having the level higher than its target level by initially operating with the external voltage in response to the initial overdrive signal and maintaining the second internal voltage to the target level voltage by successively operating with the external when the level of the second internal voltage is lowered below the target level.

Preferably, the initial overdrive control unit receives the activation signal which operates the second asynchronous internal voltage generating circuit and thus generates the initial overdrive signal having a predetermined pulse and provides the generated initial overdrive signal to the internal voltage generating circuit, and the initial operation period of the internal voltage generating circuit is determined in correspondence to the pulse width of the initial overdrive signal.

Preferably, the first asynchronous internal voltage generating circuit generates and maintains the first internal voltage by driving the external voltage, and the second asynchronous internal voltage generating circuits generate and maintain the second internal voltages by pumping the external voltage, respectively.

Preferably, the plurality of the asynchronous internal voltage generating circuits commonly receive an external command signal, and initial activation points of the plurality of the asynchronous internal voltage generating circuits are determined by the external command signal.

According to a second embodiment of the present invention, there is provided a semiconductor device, which includes a drive control unit receiving an external control signal and fed back internal voltages and outputting a plurality of drive signals having different enabled periods from one another according to a status of the external control signal and detection results of the level of the fed back internal voltages; and a plurality of internal voltage generating units sharing the external voltage and generating the internal voltages with the external voltage in response to the enablement of the drive signals respectively.

Preferably, the drive control unit controls the initial enabled periods of the drive signals to be different from one another in response to the external control signal.

Preferably, the drive control unit includes a first drive signal output unit corresponding to a first internal voltage generating unit generating a first internal voltage among the plurality of the internal voltage generating units and outputting a first drive signal for regulating the level of the first internal voltage by detecting a level of the first internal voltage by the external control signal; and a plurality of second drive signal output units corresponding to second internal voltage generating units generating second internal voltages among the plurality of the internal voltage generating units and outputting second drive signals having initial enabled periods different from one another by the external control signal and successive enabled periods according to the levels of the second internal voltages, respectively.

Preferably, the respective second drive signal output unit includes an activating unit generating an activating signal in response to the external control signal; a detecting unit operating by the activation signal and detecting the level of the second internal voltage and outputting the detection result as a detection signal; an initial overdrive control unit generating an initial overdrive signal having a predetermined enabled period in response to the activation signal; and a drive signal generating unit generating the second drive signal by combining the detection signal and the initial overdrive signal.

Preferably, the initial overdrive control unit generates the initial overdrive signal having the enabled period longer than the enabled period of the detection signal outputted at the initial operation of the detecting unit.

Preferably, the drive signal generating unit generates the second drive signal which is enabled when at least one of the detection signal and the initial overdrive signal is in an enabled state.

Preferably, the first drive signal output unit includes an activating unit generating an activation signal in response to the external control signal; and a detecting unit operating by the activation signal and detecting the level of the first internal voltage and outputting the detection result as a first drive signal.

Preferably, the plurality of the internal voltage generating units include a first internal voltage generating unit generating the first internal voltage by driving the external voltage; and a second internal voltage generating unit generating the second internal voltage by pumping the external voltage.

Preferably, the external control signal is an external command signal.

According to a third embodiment of the present invention, there is provided a semiconductor device, which includes a first asynchronous internal voltage generating circuit generating a first internal voltage by varying the level of the an external voltage at a first point in a first drive manner in response to an external control signal; and a second asynchronous internal voltage generating circuit generating a second internal voltage by varying the level of the external voltage at a second point in a second drive manner in response to the external control signal.

Preferably, the first asynchronous internal voltage generating circuit varies the level of the external voltage to the first internal voltage by driving the external voltage at the first point, and the second asynchronous internal voltage generating circuit varies the level of the external voltage to the second internal voltage by pumping the external voltage at the second point.

Preferably, the first and second asynchronous internal voltage generating circuits vary the external voltage to the first and second internal voltage levels by pumping the external voltage at the first and second points, respectively.

Preferably, the first asynchronous internal voltage generating circuit operates respectively in the first drive manner at a point that it operates firstly by the external control signal and a point that the level of the first internal voltage is varied, and the second asynchronous internal voltage generating circuit operates respectively in the second drive manner at a point that it operates firstly by the external control signal, a point between the point of the first operation and the point that the level of the first internal voltage is varied and a point that level of the second internal voltage is varied.

Preferably, the second asynchronous internal voltage generating circuit includes an activating unit generating an activation signal determining a point of the first operation in response to the external control signal; a detecting unit operating in response to the activation signal and detecting the level of the second internal voltage and outputting a detection signal determining an operation point according to the level variation of the second internal voltage; an initial overdrive control unit generating an initial overdrive signal determining an operation point between the time point of the first operation and a point that the level of the first internal voltage is varied, in response to the activation signal; a drive signal generating unit generating a drive signal by combining the detection signal and the initial overdrive signal; and an internal voltage generating unit generating the second internal voltage by varying the level of the external voltage in the second drive manner in response to the drive signal.

Preferably, the initial overdrive control unit generates the initial overdrive signal having a predetermined enabled period from a point of the enablement of the activation signal using the activation signal.

Preferably, the initial overdrive signal has an enabled period which is longer than an enabled period of the detection signal outputted at the initial operation of the detecting unit.

Preferably, the drive signal generating unit enables and outputs the drive signal when at least one of the detection signal and the initial overdrive signal is in an enabled state.

Preferably, the first asynchronous internal voltage generating circuit includes an activating unit generating an activation signal determining a point of the initial operation in response to the external control signal; a detecting unit operating in response to the activation signal and detecting the level of the first internal voltage and outputting a detection signal determining an operation point according to the level variation of the first internal voltage; a driving unit driving the first internal voltage with the external voltage in response to the drive signal.

Preferably, the external control signal corresponds to an external command signal.

Preferably, the first internal voltage corresponds to a core voltage, and the second internal voltage corresponds to a pumping voltage.

DESCRIPTION OF SPECIFIC EMBODIMENTS

Hereinafter, preferred embodiments of the present invention will be described in detail with reference to the accompanying drawings.

The present invention provides a semiconductor device that generates a plurality of internal voltages by sharing an external voltage and can minimize external voltage noise by generating the internal voltages using the external voltage at different points.

Figure 3:
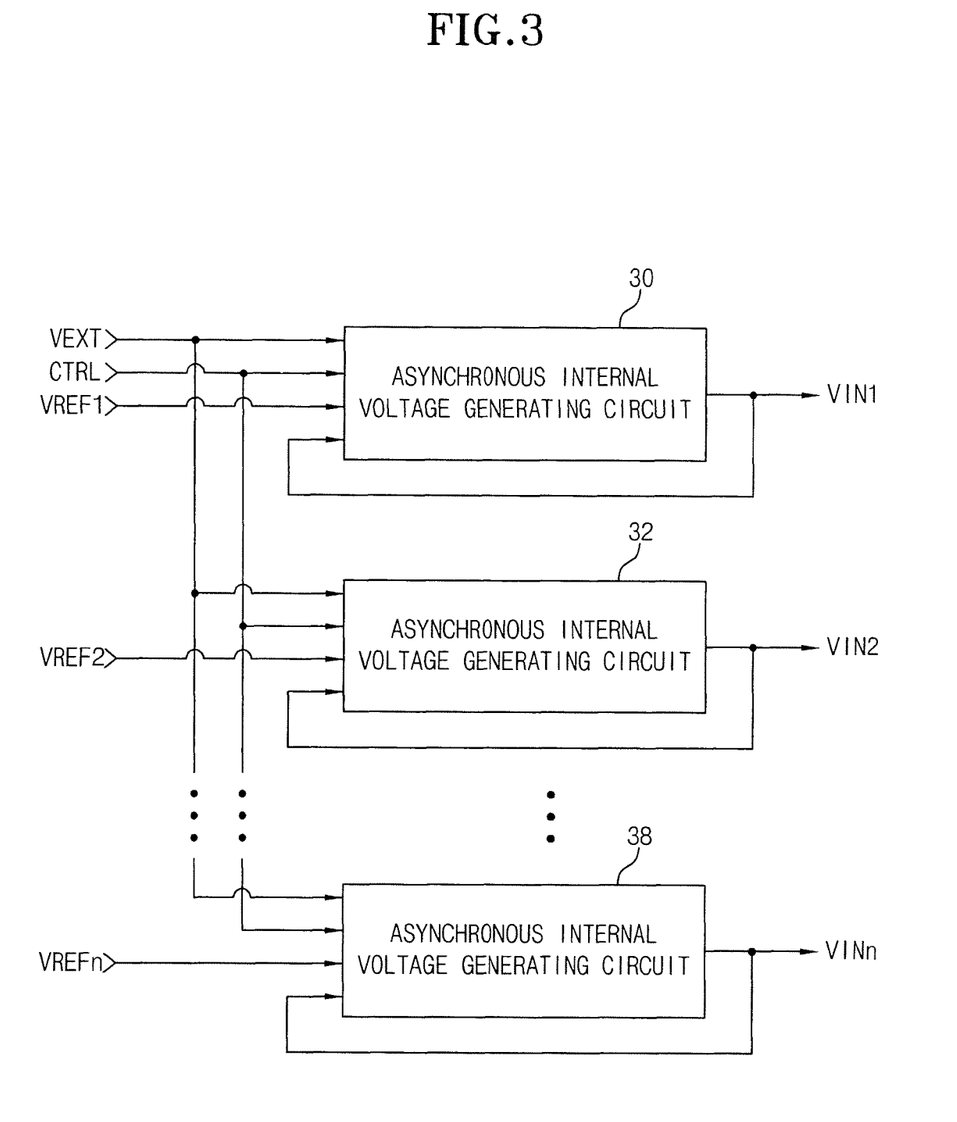
FIG. 3 is a block diagram showing a semiconductor device according to a first embodiment of the present invention.

Specifically, as shown in FIG. 3, the semiconductor device according to a first embodiment of the present invention includes a plurality of asynchronous internal voltage generating circuits 30~38 which share an external voltage VEXT and generate internal voltages VIN1~VINn ('n' is a natural number more than 2) having different voltage levels respectively. The plurality of asynchronous internal voltage generating circuits 30~38 maintain the internal voltages VIN1~VINn levels at target levels using the external voltage VEXT at different points, respectively.

Particularly, the plurality of asynchronous internal voltage generating circuits 30~38 is sequentially supplied the external voltage VEXT and compensates for a level drop through use of respective internal voltages VIN1~VINn, thereby capable of maintaining the internal voltages VIN1~VINn levels at the target levels respectively.

The plurality of asynchronous internal voltage generating circuits 30~38 may include the internal voltage generating circuit 30 which operates in a first driving manner at a predetermined point, and the internal voltage generating circuits 32~38 which operate in a second driving manner at different points based on the operation point of the internal voltage generating circuit 30, respectively.

In other words, the asynchronous internal voltage generating circuit 30 operates according to an external control signal CTRL and generates the internal voltage VIN1 at a target level by initially operating in the first driving manner with the external VEXT. The asynchronous internal voltage generating circuit 30 then maintains the internal voltage VIN1 at the target level by successively operating in the first driving manner with the external VEXT according to an internal voltage VIN1 level fed back to the asynchronous internal voltage generating circuit 30.

Herein, the external control signal CTRL activates the plurality of asynchronous internal voltage generating circuits 30~38. Particularly, the external control signal CTRL may correspond to an external command signal, e.g. a RAS command signal RASB. The first driving manner may generate the internal voltage VIN1 by driving the external voltage VEXT or may generate the internal voltage VIN1 by positive-pumping or negative-pumping the external voltage VEXT.

The external voltage may be a power voltage VDD or a ground voltage VSS, and the target level may correspond to the reference voltage VREF1 level.

The asynchronous internal voltage generating circuits 32~38 operate according to the external control signal CTRL and generate the internal voltages VIN2~VINn at levels higher than target levels by initially operating in the second driving manner with the external voltage VEXT at different points respectively. The asynchronous internal voltage generating circuits 32~38 then maintain the internal voltages VIN2~VINn at the target levels by successively operating in the second driving manner with the external VEXT according to internal voltages VIN2~VINn levels fed back to the asynchronous internal voltage generating circuits 32~38 respectively.

Herein, the second driving manner may generate the internal voltages VIN2~VINn by positive-pumping or negative-pumping the external voltage VEXT. The target levels may correspond to the reference voltages VREF2~VREFn levels, respectively.

As described above, the plurality of the asynchronous internal voltage generating circuits 30~38 can be largely divided into the asynchronous internal voltage generating circuit 30 which is supplied with the external voltage VEXT after a point where the internal voltage VIN1 is used and compensates for the level of the internal voltage VIN1, and the plurality of the asynchronous internal voltage generating circuits 32~38 which are sequentially supplied with the external voltage VEXT before the point where the internal voltage VIN1 is used and compensate for the levels of the internal voltages VIN2~VINn respectively.

According to a first embodiment of the present invention, if the asynchronous internal voltage generating circuit 30 generates the internal voltage VIN1 by driving the external voltage VEXT, the plurality of asynchronous internal voltage generating circuits 32~38 may generate the internal voltages VIN2~VINn by positive-pumping the external voltage VEXT, respectively. If the external voltage VEXT is the power voltage VDD, the internal voltage VIN1 may be a core voltage VCORE, a peripheral voltage VPERI, and the like having a level lower than the external voltage VEXT. The internal voltages VIN2~VINn may be a pumping voltage VPP and the like having a level higher than the external voltage VEXT.

Also, if the asynchronous internal voltage generating circuit 30 generates the internal voltage VIN1 by positive-pumping the external voltage VEXT, the plurality of asynchronous internal voltage generating circuits 32~38 generate internal voltages VIN2~VINn by positive-pumping the external voltage VEXT, respectively. If the asynchronous internal voltage generating circuit 30 generates the internal voltage VIN1 by negative-pumping the external voltage VEXT, the plurality of asynchronous internal voltage generating circuits 32~38 generate internal voltages VIN2~VINn by negative-pumping the external voltage VEXT, respectively. Here, the negative-pumping manner uses a ground voltage VSS as the external voltage VEXT and the internal voltage generated by the negative-pumping manner may include a back-bias voltage VBB, etc.

Figure 4:
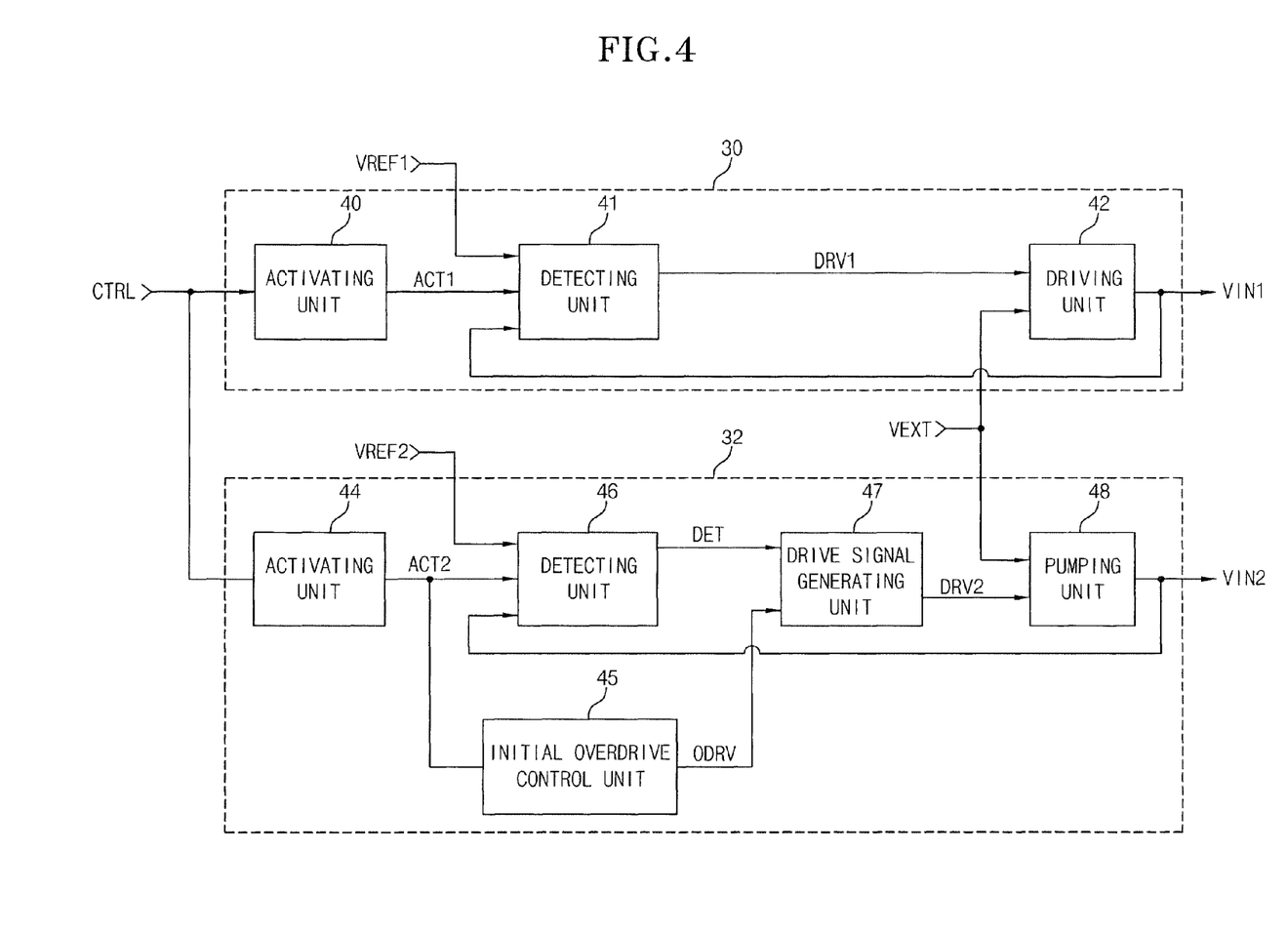
FIG. 4 is a block diagram showing an example of two asynchronous internal voltage generating circuits 30 and 32 in FIG. 3.

Among these circuits, a typical configuration of the asynchronous internal voltage generating circuit 30 and the asynchronous internal voltage generating circuit 32 will be described with reference to FIG. 4. In FIG. 4, the asynchronous internal voltage generating circuit 30 drives the external voltage VEXT and the asynchronous internal voltage generating circuit 32 pumps the external voltage VEXT.

The asynchronous internal voltage generating circuit 30 may include, as shown in FIG. 4, an activating unit 40, a detecting unit 41, and a driving unit 42.

The activating unit 40 outputs an activation signal ACT1 which is enabled at a predetermined point according to the external control signal CTRL.

The detecting unit 41 receives the activation signal ACT1, detects a level of the fed back internal voltage VIN1 by comparing the fed back internal voltage VIN1 level and the reference voltage VREF1 level, and outputs the detection result as a drive signal DRV1. Herein, it is preferable that the detecting unit 41 outputs an enabled drive signal DRV1 when the internal voltage VIN1 level is higher or lower than the reference voltage VREF1 level.

The driving unit 42 generates the internal voltage VIN1 and maintains the level of the internal voltage VIN1 by using the external voltage VEXT according to the drive signal DRV1. Herein, it is preferable that the driving unit 42 generates the internal voltage VIN1 by driving the external voltage VEXT during a period when the drive signal DRV1 is enabled.

The asynchronous internal voltage generating circuit 30 according to the configuration as described above, outputs the internal voltage VIN1 at the reference voltage VREF1 level when the activation signal ACT1 is enabled. Thereafter, the asynchronous internal voltage generating circuit 30 maintains the internal voltage VIN1 at the reference voltage VREF1 level by comparing the levels of the internal voltage VIN1 and the reference voltage VREF1.

The asynchronous internal voltage generating circuit 32 may include, as shown in FIG. 4, an initial overdrive control unit 45 which generates an initial overdrive signal ODRV and an internal voltage generating circuit which generates the internal voltage VIN2 having a level higher than a target level at initial operation according to the initial overdrive signal ODRV. Herein, the internal voltage generating circuit may include an activating unit 44, a detecting unit 46, a drive signal generating unit 47, and a pumping unit 48.

The activating unit 44 outputs an activating signal ACT2 which is enabled at a predetermined point according to the external control signal CTRL.

The initial overdrive control unit 45 outputs an initial overdrive signal ODRV with a predetermined pulse width according to the activating signal ACT2. Herein, it is preferable that the initial overdrive signal ODRV is enabled between the enabling of the activating signal ACT2 and the enabling of the drive signal DRV1 via the internal voltage VIN1, or the initial overdrive signal ODRV has a predetermined enabling period from the enabling of the activating signal ACT2.

The detecting unit 46 receives the activation signal ACT2, detects a level of the fed back internal voltage VIN2 by comparing the fed back internal voltage VIN2 level and the reference voltage VREF2 level, and outputs the detection result as a detection signal DET. Herein, it is preferable that the detecting unit 46 outputs an enabled drive signal DRV2 when the internal voltage VIN2 level is higher or lower than the reference voltage VREF2 level.

The drive signal generating unit 47 generates the drive signal DRV2 by combining the initial overdrive signal ODRV and the detection signal DET. It is preferable that the drive signal generating unit 47 enables the drive signal DRV2 when either the initial overdrive signal ODRV or the detection signal DET is in an enabled state.

The pumping unit 48 generates the internal voltage VIN2 and maintains the level of the internal voltage VIN2 by using the external voltage VEXT according to the drive signal DRV2. Herein, it is preferable that the pumping unit 48 generates the internal voltage VIN2 by pumping the external voltage VEXT during a period when the drive signal DRV2 is enabled.

Figure 5:
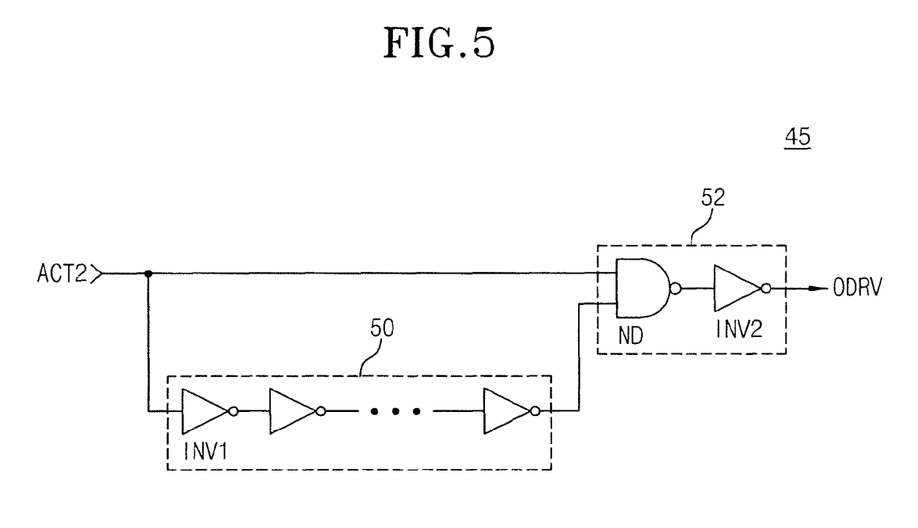
FIG. 5 is a circuit diagram showing an example of an initial overdrive control unit 45 in FIG. 4.

In the asynchronous internal voltage generating circuit 32 as configured above, the initial overdrive control unit 45 may be configured as shown in FIG. 5.

Referring to FIG. 5, the initial overdrive control unit 45 may include a delaying/inverting unit 50 delaying and inverting the activation signal ACT2 and a combining unit 52 outputting the initial overdrive signal ODRV with a predetermined pulse by logically combining the activation signal ACT2 and an output of the delaying/inverting unit 50.

The delaying/inverting unit 50 may include a plurality of serially connected inverters INV1 which receive the activation signal ACT2. Preferably, an odd number of inverters INV1 are provided in the delaying/inverting unit 50.

The combining unit 52 may include a NAND gate ND which logically NAND-combines the activation signal ACT2 and the output of the delaying/inverting unit 50. The combining unit 52 may also include an inverter INV2 which outputs the initial overdrive signal ODRV by inverting an output of the NAND gate ND.

Figure 6:
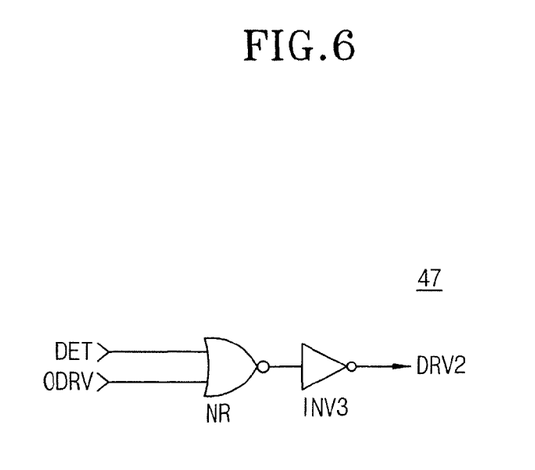
FIG. 6 is a circuit diagram showing an example of a drive signal generating unit 47 in FIG. 4.

In the asynchronous internal voltage generating circuit 32 as configured above, the drive signal generating unit 47 may be configured as shown in FIG. 6.

Referring to FIG. 6, the drive signal generating unit 47 may include a NOR gate NR which logically NOR-combines the detection signal DET and the initial overdrive signal ODRV and an inverter INV3 which outputs the drive signal DRV2 by inverting an output of the NOR gate NR.

The asynchronous internal voltage generating circuit 32 having the configuration described above outputs the internal voltage VIN2 exceeding the reference voltage VREF2 between the enabling of the activation signal ACT2 and the enabling of the drive signal DRV1 via the internal voltage VIN1 and then maintains the internal voltage VIN2 level at the reference voltage VREF2 level by comparing the internal voltage VIN2 level and the reference voltage VREF2 level.

As can be appreciated from the configuration of FIG. 4, the asynchronous internal voltage generating circuits 30 and 32 control the operation points of the driving unit 42 and the pumping unit 48 so that they are different from each other. Particularly, the level of the internal voltage VIN2 is initially set higher than the reference voltage VREF2 through the operation of the pumping unit 48. Thus, the operation points of the driving unit 42 and the pumping unit 48 can be controlled such that they are different from each other.

For example, where the asynchronous internal voltage generating circuit 30 receives the RAS command signal RASB as the external control signal CTRL and generates the internal voltage VIN1 corresponding to the core voltage VCORE, and the asynchronous internal voltage generating circuit 32 receives the RAS command signal RASB as the external control signal CTRL and generates the internal voltage VIN2 corresponding to the pumping voltage VPP, the operations of the two asynchronous internal voltage generating circuits 30 and 32 are as follows.

In the operation of the asynchronous internal voltage generating circuit 30, the activation signal ACT1 is generated through the activating unit 40 when the external control signal CTRL is enabled. At this time, the activation signal ACT1 is preferably enabled before charge sharing of the bit line pair.

As the activation signal ACT1 is enabled, the detecting unit 41 compares the levels of the internal voltage VIN1 and the reference voltage VREF1. The drive signal DRV1 is enabled through the detecting unit 41 until the internal voltage VIN1 is raised to the reference voltage VREF1 level since the level of the internal voltage VIN1 at this time is nearly zero.

While the drive signal DRV1 is enabled, the external voltage VEXT is supplied through the driving unit 42 and the internal voltage VIN1 is raised to the reference voltage VREF1 level.

Subsequently, the internal voltage VIN1 level drops when the internal voltage VIN1 is used, e.g., when the bit line pair is developed after the charge sharing of the bit line pair. The drive signal DRV1 is enabled again through the detecting unit 41 when the level of the internal voltage VIN1 is lower than the reference voltage VREF1 level. Therefore, the driving unit 42 raises the level of the internal voltage VIN1 again. The driving unit 42 stops operation according to a disabled drive signal DRV1 when the internal voltage VIN1 level exceeds the reference voltage VREF1 level. The repetition of these operations maintains the internal voltage VIN1 level at the reference voltage VREF1 level.

In the operation of the asynchronous internal voltage generating circuit 32, the activation signal ACT2 is generated through the activating unit 44 when the external control signal CTRL is enabled. At this time, the activation signal ACT2 is preferably enabled before activation of the word line.

As the activation signal ACT2 is enabled, the initial overdrive signal ODRV is generated through the initial overdrive control unit 45 and the detection signal DET is generated through the detecting unit 46. The detection signal DET is generated by comparing the internal voltage VIN2 level and the reference voltage VREF2 level and maintains an enable state until the internal voltage VIN2 level is raised to the reference voltage VREF2 level. An enable period of the initial overdrive signal ODRV is determined by the delayed amount of the delaying/inverting unit 50 of the initial overdrive control unit 45. The initial overdrive signal ODRV is generated having an enable period longer than the enable period of the detection signal DET.

The initial overdrive signal ODRV generated in the initial overdrive control unit 45 and the detection signal DET generated in the detecting unit 46 are inputted to the drive signal generating unit 47. The initial overdrive signal ODRV and the detection signal DET are combined through the drive signal generating unit 47 to output the drive signal DRV2. At this time, the drive signal DRV2 has an enable period corresponding to the enable period of the initial overdrive signal ODRV since the initial overdrive signal ODRV is disabled later than the detection signal DET is disabled.

While the drive signal DRV2 is enabled, the external voltage VEXT is supplied through the pumping unit 48 and the level of the internal voltage VIN2 is raised. At this time, the internal voltage VIN2 level is raised higher than the reference voltage VREF2 level as the enable period of the drive signal DRV2 corresponds to the enable period of the initial overdrive signal ODRV.

In other words, in the initial operation of the asynchronous internal voltage generating circuit 32, an over-pumping is performed through the pumping unit 48 and the internal voltage VIN2 is formed at a level higher than the reference voltage VREF2 level.

Subsequently, the internal voltage VIN2 level drops when the internal voltage VIN2 is used, e.g., when the word line is activated. The drive signal DRV2 is enabled again through the detecting unit 46 when the internal voltage VIN2 level is lowered below the reference voltage VREF2 level. Therefore, the internal voltage VIN2 level is raised again through the pumping unit 48. The pumping unit 48 stops the pumping operation according to a disabled drive signal DRV2 when the internal voltage VIN2 level exceeds the reference voltage VREF2 level. The repetition of these operations maintains the internal voltage VIN2 level at the reference voltage VREF2 level.

Figure 7:
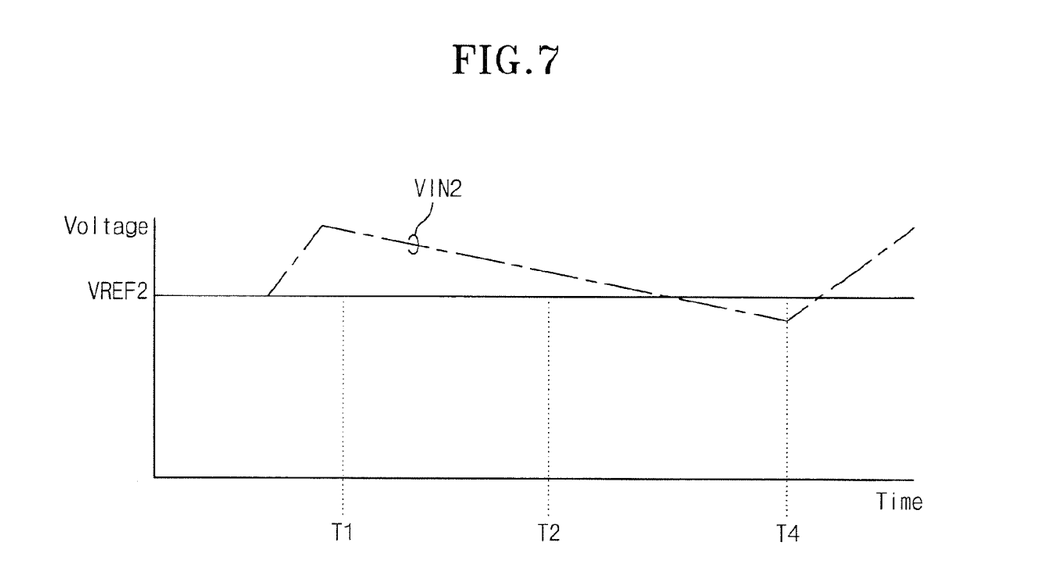
FIG. 7 is a waveform diagram illustrating a variation in voltage level of an internal voltage VIN2 over time outputted from the asynchronous internal voltage generating circuit 32 in FIG. 4.

Variation of the internal voltage VIN2 level according to the operation of the asynchronous internal voltage generating circuit 32 corresponding to the pumping voltage generating circuit is shown in FIG. 7. In FIG. 7, 'T1' corresponds to 'T1' in FIGS. 2A and 2B, and 'T2' corresponds to 'T2' in FIGS. 2A and 2B.

Referring to FIG. 7, the internal voltage VIN2 level is raised higher than the reference voltage VREF2 level according to the over-pumping of the pumping unit 48 at initial operation. The internal voltage VIN2 level gradually drops as the internal voltage VIN2 is used from point 'T1'. At this time, the over-pumping of the asynchronous internal voltage generating circuit 32 occurs before point 'T1' at which point the word line is activated.

When the internal voltage VIN2 level is lowered below the reference voltage VREF2 level during the gradual drop of the internal voltage VIN2 level, the pumping of the pumping unit 48 is performed again. Therefore, the internal voltage VIN2 level is raised again from point 'T4'.

At this time, due to the initial over-pumping of the internal voltage VIN2, point 'T4' of successive pumping of the pumping unit 48 occurs after the point of successive driving of the asynchronous internal voltage generating circuit 30.

In other words, the asynchronous internal voltage generating circuit 30 raises the internal voltage VIN1 level by performing successive driving operations with the external voltage VEXT at point 'T2' after initial normal driving. Thus, the external voltage VEXT level drop occurs at point 'T2'. The asynchronous internal voltage generating circuit 32 raises the internal voltage VIN2 level by performing successive pumping operations with the external voltage VEXT at point 'T4', which is later than point 'T2', after initial over-pumping. Thus, the external voltage VEXT level drop occurs at point 'T4'.

As described above, a rapid drop of the external voltage VEXT level does not occur since the successive driving of the asynchronous internal voltage generating circuit 30 and the initial or successive pumping of the asynchronous internal voltage generating circuit 32 occur at different points from each other due to the initial over-pumping of the internal voltage VIN2. Therefore, external voltage VEXT noise is minimized. As a result, errors or lowering in properties which influence the entire semiconductor chip can be prevented.

A plurality of asynchronous internal voltage generating circuits 30, 32 and 38 shown in FIG. 3 can employ the same configuration and operation as the two asynchronous internal voltage generating circuits 30 and 32 described. Therefore, the reduction of external voltage VEXT noise can be further improved.

In this case, initial overdrives of the plurality of asynchronous internal voltage generating circuits 32 and 38 can be varied by the initial overdrive control units 45 provided in the respective asynchronous internal voltage generating circuits 32 and 38.

In other words, the initial overdrive control units 45 provided in the respective asynchronous internal voltage generating circuits 32 and 38 can control the initial overdrive points of the asynchronous internal voltage generating circuits 32 and 38 so that the initial overdrive points are different from each other by generating initial overdrive control signals ODRV having different enable periods.

In one example, the number of inverters INV1 of the delaying/inverting unit 50 provided in the respective initial over drive control units 45 may be different from one another.

Thus, the pulse widths of the initial overdrive signals ODRV generated in the initial over drive control units 45 are different from one another.

In another example, enable points of the initial overdrive signals ODRV generated in the respective initial over drive control units 45 may be different from one another. Such a configuration can be easily realized by employing a pulse generating circuit that is well known in the art. Therefore, a detailed description of the pulse generating circuit is omitted.

Figure 8:
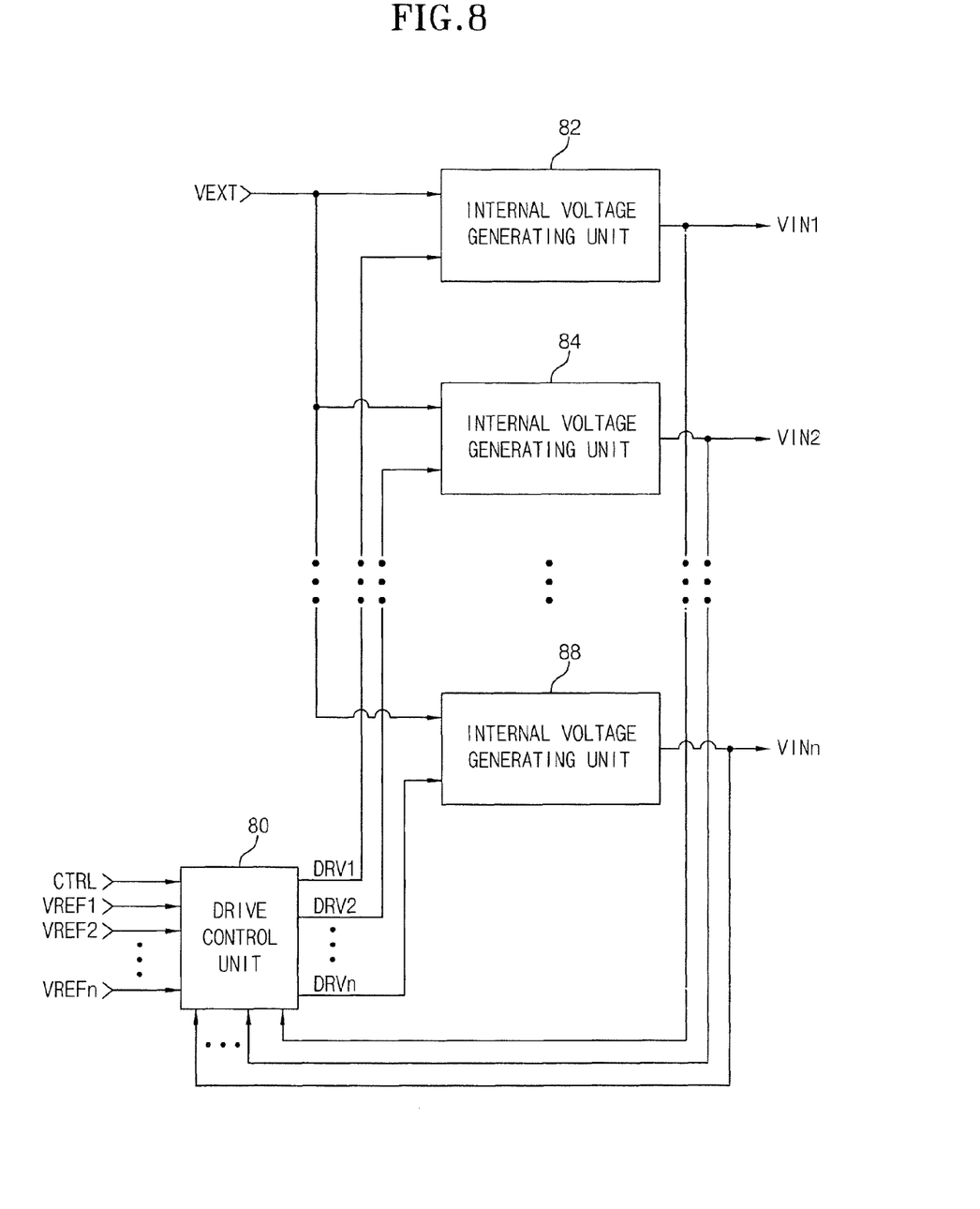
FIG. 8 is a block diagram showing a semiconductor device according to a second embodiment of the present invention.

Meanwhile, a semiconductor device according to a second embodiment of the present invention includes a drive control unit 80 and a plurality of internal voltage generating units 82~88 as shown in FIG. 8.

The drive control unit 80 receives an external control signal CTRL, reference voltages VREF1~VREFn, and internal voltages VIN1~VINn fed back to the drive control unit 80, and outputs a plurality of drive signals DRV1~DRVn having different enable points from each another according to the status of the external control signal CTRL and a result of detecting the internal voltages VIN1~VINn levels. Herein, the reference voltages VREF1~VREFn correspond to target levels of the internal voltages VIN1~VINn, respectively.

This drive control unit 80 includes a first drive signal output unit (not shown) which outputs a drive signal DRV1 controlling an operation of the internal voltage generating unit 82 and a plurality of second drive signal output units (not shown) which outputs drive signals DRV2~DRVn controlling operations of the internal voltage generating units 84~88 respectively.

The first drive signal output unit operates according to the external control signal CTRL and outputs the drive signal DRV1 by comparing and detecting the internal voltage VIN1 fed back to the drive control unit 80 with the reference voltage VREF1. The first drive signal output unit corresponds to a configuration including the activating unit 40 and the detecting unit 41 of FIG. 4.

The plurality of second drive signal output units operate according to the external control signal CTRL and output the drive signals DRV2~DRVn having different initial enable periods by the external control signal CTRL and successive enable periods according to the level detection results of the internal voltages VIN1~VINn fed back to the drive control unit 80, respectively. The second drive signal output units correspond to a configuration including the activating unit 44, the initial overdrive control unit 45, the detecting unit 46 and the drive signal generating unit 47 of FIG. 4.

The plurality of internal voltage generating units 82~88 generate the internal voltages VIN1~VINn with the external voltage VEXT according to the enablement of drive signals DRV1~DRVn. The internal voltage generating unit 82 which generates the internal voltage VIN1 corresponds to a configuration including the driving unit 42 of FIG. 4. The internal voltage generating unit 84~88 correspond to a configuration including the pumping unit 48 of FIG. 4.

The semiconductor device according to a second embodiment of the present invention, like the semiconductor device according to a first embodiment of the present invention, generates internal voltages VIN1~VINn with the external voltage VEXT at different points and may have the same effect as the semiconductor device according to a first embodiment of the present invention.

As described above, there is an advantage in that a peak value of the external voltage level drop is reduced since the semiconductor device according to the present invention drives and pumps the internal voltages at different points.

Also, there is an advantage in that noise in the external voltage is minimized preventing malfunction of the semiconductor device since the semiconductor device according to the present invention generates internal voltages by using an external voltage at different points.

Those skilled in the art will appreciate that the specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

What is claimed is:

1. A semiconductor device, comprising:
   a plurality of asynchronous internal voltage generating circuits sharing an external voltage and generating internal voltages having different levels from one another by comparing the internal voltages and respective reference voltages, each of which has fixed level,
   wherein at least one asynchronous internal voltage generating circuit of the plurality of asynchronous internal voltage generating circuits makes the internal voltage have a predetermined target level using the external voltage regardless of the voltage level of the internal voltage compared to that of the respective reference voltage for a predetermined period,
   wherein the plurality of asynchronous internal voltage generating circuits comprises:
   a first asynchronous internal voltage generating circuit suitable for generating a first internal voltage; and
   a plurality of second asynchronous internal voltage generating circuits suitable for generating a second internal voltage, and
   wherein each of the plurality of second asynchronous internal voltage generating circuits comprises:
   the initial overdrive control unit suitable for receiving an activation signal which operates the second asynchronous internal voltage generating circuit, and generates an initial overdrive signal in response to the activation signal; and
   an internal voltage generating circuit generating the second internal voltage having the level higher than a second internal voltage target level by initially operating using the external voltage according to the initial overdrive signal.

2. The semiconductor device as set forth in claim 1, wherein the plurality of the internal voltage generating circuits are supplied with the external voltage at different points from one another and compensate for level drops due to the uses of the internal voltages to maintain the internal voltages levels at the target levels, respectively.

3. The semiconductor device as set forth in claim 1, wherein the plurality of the asynchronous internal voltage generating circuits comprises:
   a first asynchronous internal voltage generating circuit generating a first internal voltage using the external voltage and maintaining the first internal voltage at a first internal voltage target level by supplying the external voltage when the first internal voltage is used; and
   a second asynchronous internal voltage generating circuit generating a second internal voltage using the external voltage and maintaining the second internal voltage at a second internal voltage target level by supplying the external voltage before the first internal voltage is used.

4. The semiconductor device as set forth in claim 3, wherein the first asynchronous internal voltage generating circuit generates the first internal voltage and maintains the level of the generated first internal voltage by driving the external voltage, and the second asynchronous internal voltage generating circuit generates the second internal voltage and maintains the level of the generated second internal voltage by pumping the external voltage.

5. The semiconductor device as set forth in claim 3, wherein the first and second asynchronous internal voltage generating circuits generate the first and second internal voltages and maintain the level of the generated first and second internal voltages by pumping the external voltage.

6. The semiconductor device as set forth in claim 1, wherein the plurality of the asynchronous internal voltage generating circuits comprises:
   a first asynchronous internal voltage generating circuit generating a first internal voltage having a level substantially the same as a first internal voltage target level using the external voltage and maintaining the first internal voltage level at the first internal voltage target level using the external voltage when the first internal voltage fed back to the first asynchronous internal voltage generating circuit is outside the first internal voltage target level; and
   a plurality of second asynchronous internal voltage generating circuits sequentially generating second internal voltages having levels higher than second internal voltages target levels using the external voltage and maintaining the second internal voltages at the second internal voltages target levels using the external voltage when the second internal voltages fed back to the plurality of second asynchronous internal voltage generating circuits are lower than the second internal voltage target levels, respectively.

7. The semiconductor device as set forth in claim 6, wherein the respective second asynchronous internal voltage generating circuit comprises:
   an initial overdrive control unit generating an initial overdrive signal; and
   an internal voltage generating circuit generating the second internal voltage having the level higher than the second internal voltage target level by initially operating using the external voltage according to the initial overdrive signal and maintaining the second internal voltage at the second internal voltage target level voltage by successively operating using the external voltage when the level of the second internal voltage is lower than the second internal voltage target level.

8. The semiconductor device as set forth in claim 7, wherein the initial overdrive control unit receives an activation signal which operates the second asynchronous internal voltage generating circuit, generates the initial overdrive signal having a predetermined pulse, and provides the generated initial overdrive signal to the internal voltage generating circuit, and
   wherein an initial operation period of the internal voltage generating circuit is determined corresponding to the pulse width of the initial overdrive signal.

9. The semiconductor device as set forth in claim 6, wherein the first asynchronous internal voltage generating circuit generates and maintains the first internal voltage by driving the external voltage, and the second asynchronous internal voltage generating circuits generate and maintain the second internal voltages by pumping the external voltage, respectively.

10. The semiconductor device as set forth in claim 1, wherein the plurality of asynchronous internal voltage generating circuits commonly receive an external command signal, and initial activation points of the plurality of asynchronous internal voltage generating circuits are determined by the external command signal.

11. A semiconductor device, comprising:
a drive control unit receiving an control signal and fed back internal voltages and outputting a plurality of drive signals having different enable periods from one another according to a status of the control signal and detection results of the fed back internal voltages levels; and
a plurality of internal voltage generating units sharing an external voltage and generating internal voltages using the external voltage according to the enabled drive signals respectively,
wherein at least one of the drive signals makes the corresponding internal voltage generating units generate the internal voltage having a predetermined target level regardless of a voltage level of the internal voltage compared to that of a corresponding reference voltage and then maintain the predetermined target level by comparing the voltage level of the internal voltage and the level of the corresponding reference voltage, the corresponding reference voltage has a fixed level,
wherein the drive control unit comprises:
a first drive signal output unit; and
a second drive signal output unit, and
wherein the second drive signal output unit comprises:
an activating unit generating an activating signal in response to the control signal;
a detecting unit operating in response to the activation signal, detecting the second internal voltage level and outputting the detection result as a detection signal;
an initial overdrive control unit generating an initial overdrive signal having a predetermined enable period in response to the activation signal; and
a drive signal generating unit generating the second drive signal by combining the detection signal and the initial overdrive signal.

12. The semiconductor device as set forth in claim 11, wherein the drive control unit controls the initial enable periods of the drive signals to be different from one another according to the control signal.

13. The semiconductor device as set forth in claim 11, wherein the
the first drive signal output unit corresponds to a first internal voltage generating unit generating a first internal voltage among the plurality of internal voltage generating units and outputs a first drive signal for regulating the level of the first internal voltage by detecting the first internal voltage level according to the control signal; and
the plurality of second drive signal output units corresponds to a plurality of second internal voltage generating units generating second internal voltages among the plurality of internal voltage generating units and outputs second drive signals having initial enable periods different from one another according to the control signal and successive enable periods according to the second internal voltages levels, respectively.

14. The semiconductor device as set forth in claim 13, wherein the first drive signal output unit includes:
an activating unit generating an activation signal according to the control signal; and
a detecting unit operating according to the activation signal and detecting the first internal voltage level and outputting the detection result as the first drive signal.

15. The semiconductor device as set forth in claim 11, wherein the initial overdrive control unit generates the initial overdrive signal where the enable period is longer than the enable period of the detection signal outputted at the initial operation of the detecting unit.

16. The semiconductor device as set forth in claim 11, wherein the drive signal generating unit generates the second drive signal which is enabled when at least one of the detection signal and the initial overdrive signal is in an enable state.

17. The semiconductor device as set forth in claim 11, wherein the plurality of internal voltage generating units include:
a first internal voltage generating unit generating a first internal voltage by driving the external voltage; and
a second internal voltage generating unit generating a second internal voltage by pumping the external voltage.

18. The semiconductor device as set forth in claim 11, wherein the control signal is an external command signal.

19. A semiconductor device, comprising:
a first asynchronous internal voltage generating circuit generating a first internal voltage based on an external voltage at a first point in response to an control signal and making the first internal voltage maintain a first target voltage level when a voltage level of the first internal voltage is lower than the first target voltage level; and
a second asynchronous internal voltage generating circuit generating a second internal voltage based on the external voltage at a second point in response to the control signal,
wherein the second asynchronous internal voltage generating circuit makes the second internal voltage have a second predetermined target level regardless of a voltage level of the second internal voltage compared to that of a reference voltage and then maintain the second predetermined target level by comparing the voltage level of the second internal voltage and the reference voltage, the reference voltage has a fixed level,
wherein the second synchronous internal voltage generating circuit includes:
an activating unit generating an activation signal determining a point of first operation according to the control signal;
a detecting unit operating according to the activation signal and detecting a second internal voltage level and outputting a detection signal determining an operation point according to variation of the second internal voltage level;
an initial overdrive control unit generating an initial overdrive signal determining an operation point between first operation and when the first internal voltage level is varied according to the activation signal;
a drive signal generating unit generating a drive signal by combining the detection signal and the initial overdrive signal; and
an internal voltage generating unit generating the second internal voltage by varying the external voltage level in the second drive manner according to the drive signal.

20. The semiconductor device as set forth in claim 19, wherein the first asynchronous internal voltage generating circuit varies a voltage level of the external voltage to a level of the first internal voltage by driving the external voltage at the first point, and the second asynchronous internal voltage generating circuit varies the voltage level of the external voltage level to a level of the second internal voltage by pumping the external voltage at the second point.

21. The semiconductor device as set forth in claim 19, wherein the first and second asynchronous internal voltage generating circuits vary the external voltage to the levels of the first and second internal voltages by pumping the external voltage at the first and second points, respectively.

22. The semiconductor device as set forth in claim 19, wherein the first asynchronous internal voltage generating circuit operates at a point when the first asynchronous internal voltage generating circuit first operates according to the control signal and at a point when a level of the first internal voltage is varied, and the second asynchronous internal voltage generating circuit operates at a point when the second asynchronous internal voltage generating circuit first operates according to the control signal, a point between the first operation and when the level of the first internal voltage is varied, and a point when a level of the second internal voltage is varied.

23. The semiconductor device as set forth in claim 19, wherein the second asynchronous internal voltage generating circuit includes:
 an activating unit generating an activation signal determining a point of first operation according to the control signal;
 a detecting unit operating according to the activation signal and detecting a second internal voltage level and outputting a detection signal determining an operation point according to variation of the second internal voltage level;
 an initial overdrive control unit generating an initial overdrive signal determining an operation point between first operation and when the first internal voltage level is varied according to the activation signal;
 a drive signal generating unit generating a drive signal by combining the detection signal and the initial overdrive signal; and
 an internal voltage generating unit generating the second internal voltage by varying the external voltage level in the second drive manner according to the drive signal.

24. The semiconductor device as set forth in claim 23, wherein the initial overdrive control unit generates the initial overdrive signal having a predetermined enable period from an enabling point of the activation signal using the activation signal.

25. The semiconductor device as set forth in claim 24, wherein the initial overdrive signal has an enable period longer than an enable period of the detection signal outputted at the initial operation of the detecting unit.

26. The semiconductor device as set forth in claim 23, wherein the drive signal generating unit enables and outputs the drive signal when at least one of the detection signal and the initial overdrive signal is in an enable state.

27. The semiconductor device as set forth in claim 19, wherein the first asynchronous internal voltage generating circuit includes:
 an activating unit generating an activation signal determining a point of initial operation according to the control signal;
 a detecting unit operating according to the activation signal and detecting a first internal voltage level and outputting a detection signal determining an operation point according to variation of the first internal voltage level;
 a driving unit driving the first internal voltage using the external voltage according to the drive signal.

28. The semiconductor device as set forth in claim 19, wherein the control signal corresponds to an external command signal.

29. The semiconductor device as set forth in claim 19, wherein the first internal voltage corresponds to a core voltage, and the second internal voltage corresponds to a pumping voltage.

* * * * *